US010294146B2

(12) United States Patent
Li et al.

(10) Patent No.: US 10,294,146 B2
(45) Date of Patent: May 21, 2019

(54) SINGLE MODE OPTICAL FIBERS WITH BRILLOUIN FREQUENCY-SHIFT MANAGEMENT

(71) Applicant: Corning Incorporated, Corning, NY (US)

(72) Inventors: Ming-Jun Li, Horseheads, NY (US); Shenping Li, Painted Post, NY (US); Jeffery Scott Stone, Addison, NY (US)

(73) Assignee: Corning Incorporated, Corning, NY (US)

( * ) Notice: Subject to any disclaimer, the term of this patent is extended or adjusted under 35 U.S.C. 154(b) by 72 days.

(21) Appl. No.: 15/691,139

(22) Filed: Aug. 30, 2017

(65) Prior Publication Data

US 2018/0057396 A1    Mar. 1, 2018

Related U.S. Application Data

(60) Provisional application No. 62/381,797, filed on Aug. 31, 2016.

(51) Int. Cl.
*G02B 6/00* (2006.01)
*C03C 13/04* (2006.01)
(Continued)

(52) U.S. Cl.
CPC ...... *C03C 13/046* (2013.01); *C03B 37/01237* (2013.01); *C03B 37/02763* (2013.01);
(Continued)

(58) Field of Classification Search
CPC ... G02B 6/02; G02B 6/02004; G02B 6/02009
(Continued)

(56) References Cited

U.S. PATENT DOCUMENTS 3,711,262 A    1/1973 Keck et al.
3,932,162 A    1/1976 Blankenship
(Continued)

FOREIGN PATENT DOCUMENTS

GB    2213142 A    9/1989
WO    2004027941 A1    4/2004

OTHER PUBLICATIONS

Akasaka et al; "Suppression of Stimulated Brillouin Scattering on Dispersion Shifted Fiber With Longitudinal Uniform Zero Dispersion"; 2nd Optoelectronics & Communications Conference (OECC '97) Technical Digest, Jul. 1997, Seoul Korea, pp. 274-275.
(Continued)

*Primary Examiner* — Kevin K Pyo
(74) *Attorney, Agent, or Firm* — John P. McGroarty; Svetlana Z. Short

(57) ABSTRACT

The single-mode optical fibers have a core region that includes an inner core region having a delta value $\Delta_1$ and a radius $r_1$ immediately surrounded by an outer core region of radius $r_2$ and a delta value $\Delta_2 < \Delta_1$, wherein $\Delta_1 - \Delta_2$ is in the range from 0.3% to 2%. A cladding region of radius $r_3$ immediately surrounds the core region. The inner and outer regions define an annular width $\delta r = r_2 - r_1$. At least one of $r_1$, $r_2$, $\delta r$ and $r_3$ changes with a period p in the longitudinal direction between first and second values each having a corresponding level distance $d_F$. The change occurs over a transition distance $d_T$ such that $d_T/d_F < 0.1$. The Brillouin frequency shift $\Delta f$ changes by an amount $\delta[\Delta f]$ that is least 10 MHz over each period p, thereby allowing for Brillouin frequency-shift management in fiber-based sensor systems.

31 Claims, 12 Drawing Sheets

(51) Int. Cl.

| | | |
|---|---|---|
| *G02B 6/036* | (2006.01) | |
| *G02B 6/02* | (2006.01) | |
| *C03B 37/012* | (2006.01) | |
| *G01D 5/353* | (2006.01) | |
| *C03B 37/027* | (2006.01) | |
| *C03C 3/06* | (2006.01) | |
| *H04B 10/25* | (2013.01) | |
| *H04B 10/071* | (2013.01) | |
| *C03B 37/025* | (2006.01) | |
| *C03B 37/018* | (2006.01) | |

(52) U.S. Cl.
CPC ............. *C03C 3/06* (2013.01); *G01D 5/3538* (2013.01); *G01D 5/35364* (2013.01); *G02B 6/02014* (2013.01); *G02B 6/03633* (2013.01); *C03B 37/018* (2013.01); *C03B 37/025* (2013.01); *C03B 2203/18* (2013.01); *C03B 2203/22* (2013.01); *C03B 2203/24* (2013.01); *C03C 2201/31* (2013.01); *C03C 2213/00* (2013.01); *H04B 10/071* (2013.01); *H04B 10/25* (2013.01)

(58) Field of Classification Search
USPC ................. 250/227.11, 227.18; 385/123–128
See application file for complete search history.

(56) References Cited

U.S. PATENT DOCUMENTS

| | | | |
|---|---|---|---|
| 4,038,062 A | 7/1977 | Presby | |
| 4,163,370 A | 8/1979 | Kurth | |
| 4,176,911 A | 12/1979 | Marcatili et al. | |
| 5,267,339 A | 11/1993 | Yamauchi et al. | |
| 5,400,422 A | 3/1995 | Askins et al. | |
| 5,848,215 A | 12/1998 | Akasaka et al. | |
| 5,851,259 A | 12/1998 | Clayton et al. | |
| 6,205,279 B1* | 3/2001 | Kim ................... | G02B 6/02238 385/124 |
| 6,539,154 B1 | 3/2003 | Berkey et al. | |
| 6,542,683 B1* | 4/2003 | Evans ................... | C03B 37/027 385/127 |
| 7,190,868 B2 | 3/2007 | Yamamoto et al. | |
| 7,246,806 B2 | 7/2007 | Andre et al. | |
| 7,394,959 B2 | 7/2008 | Breuls et al. | |
| 7,437,040 B2 | 10/2008 | Flammer | |

OTHER PUBLICATIONS

Bao et al; "Recent Progress in Brillouin Scattering Based Fiber Sensors"; Sensors, 2011, 11, 4152-4187.

DiMarcello et al; "Fiber Drawing and Strength Properties"; Optical Fiber Communications, vol. 1; 1985; pp. 179-248.

Hansryd et al; "Increase of the SBS Threshold in a Short Highly Nonlinear Fiber by Applying a Temperature Distribution", Jounal of Lightwave Technology, vol. 19, No. 11, Nov. 2001; pp. 1691-1697.

Horiguchi et al; "Development of a Distributed Sensing Technique Using Brillouin Scattering"; Journal of Lightwave Technology, vol. 13, No. 17, Jul. 1995; pp. 1296-1302.

Hotate et al; "Distributed Dynamic Strain Measurement Using a Correlation-Based Brillouin Sensing System"; IEEE Photonics Technology Letters, vol. 15, No. 2, Feb. 2003; pp. 272-274.

Jeong et al; "Expansion of Spatial Measurement Range in a Correlation Based Brillouin Optical Sensing System"; Proc. of SPIE, vol. 7753, pp. 77532A-1-77532A-4; 2011.

Sakamoto et al; "SBS Suppressed Fiber With Hole-Assisted Structure" Journal of Lightwave Technology, vol. 27, No. 20, Oct. 15, 2009; pp. 4401-4406.

Shiraki et al; "Performance of Strain-Free Stimulated Brillouin Scattering Suppression Fiber"; Journal of Lightwave Technology, vol. 14, No. 4 Apr. 1996; pp. 549-554.

Shiraki et al; "Suppression of Stimulated Brillouin Scattering in a Fibre by Changing the Core Radius"; Electronics Letters, Apr. 13, 1995, vol. 31, No. 8 pp. 668-669.

Stiller et al; "Suppression of SBS in a Photonic Crystal Fiber With Periodically-Varied Core Diameter"; OSA/OFC/NFOEC; 2011; 3 Pages.

Yoshizawa et al; "Stimulated Brillouin Scattering Suppression by Means of Applying Strain Distribution to Fiber With Cabling"; Journal of Lightwave Technology, vol. 11, No. 10, Oct. 1993; pp. 1518-1522.

\* cited by examiner

US 10,294,146 B2

SINGLE MODE OPTICAL FIBERS WITH BRILLOUIN FREQUENCY-SHIFT MANAGEMENT

This application claims the benefit of priority under 35 U.S.C. § 119 of U.S. Provisional Application Ser. No. 62/381,797, filed on Aug. 31, 2016, the content of which is relied upon and incorporated herein by reference in its entirety.

FIELD

The present disclosure relates to optical fibers, and in particular to single mode optical fibers with Brillouin frequency-shift management.

BACKGROUND

Stimulated Brillouin scattering (SBS) is a non-linear interaction of light (photons) traveling through a transparent medium such as a glass matrix and interacting with spatial and temporal variations in the refractive index of the medium. In optical fibers, SBS occurs when the light interacts coherently with acoustic waves in the fiber via combination of electrostriction and a photo-elastic effect.

SBS causes a change in the frequency of the light traveling through the transparent medium. The change in frequency of the light due to SBS as it propagates through the transparent medium (e.g., an optical fiber) is called the Brillouin frequency shift (BFS) and is denoted herein as $\Delta f$.

SBS effects for guided light traveling in optical fibers limit the use of the optical fibers for some applications. For example, it limits the maximum optical power throughput of optical fiber transmission systems. As the input optical power increases above what is known as the threshold power, the amount of optical power that can be transmitted down the optical fiber reaches an upper limit. Any additional input power to the fiber results in SBS wherein the light scatters in the backward direction due to interaction with acoustic phonons rather than propagating in the forward (launch) direction as a higher-power signal.

In fiber-based sensor applications, SBS limits the sensing range. For example, in some fiber-based sensors, the BFS distorts the spectrum at the far end of the sensing fiber, which in turn distorts the sensor measurement. This is problematic especially since fiber-based sensors are finding increasing use in the remote monitoring of a wide variety of structures such as bridges, oil and gas pipelines, dams, power lines, tunnels, oil wells, etc.

SUMMARY

A single-mode optical fiber configured for managing (i.e., suppressing) BFS is disclosed, as well as methods of making such a fiber. The fibers can be used to increase the sensing distance and/or to improve the signal-to-noise of all major Brillouin-effect-based fiber sensors, which include Brillouin optical time domain reflectometry (BOTDR) Brillouin optical time domain analysis (BOTDA), Brillouin optical correlation domain analysis (BOCDA) and Brillouin optical correlation-domain reflectometry (BOCDR). Because of the large amplitude of $\Delta f$ that can be managed by the fibers disclosed herein, the fibers and methods are useful for non-linear device applications, nonlinear devices, telecommunication systems, and high power fiber lasers.

An aspect of the disclosure is a single-mode optical fiber comprising a longitudinal direction and a Brillouin frequency shift $\Delta f$. The optical fiber includes: a core region comprising an inner core region immediately surrounded by an outer core region, the inner core region comprising a delta value of $\Delta_1$ and radius of $r_1$, and the outer core region comprising a delta value $\Delta_2 < \Delta_1$ and a radius $r_2 > r_1$ and an annular width $\delta r = r_2 - r_1$, wherein $r_2$ is in the range from 3 µm to 10 µm and $\delta r$ is in the range from 1 µm to 9 µm, and wherein $\Delta_1 - \Delta_2$ is in the range from 0.3% to 2%; a cladding region immediately surrounding the outer core region and comprising a delta value of $\Delta_3 < \Delta_2$ and a radius $r_3 > r_2$, wherein $r_3$ is in the range from 100 to 150 µm; and wherein at least one of $r_1$, $r_2$, $\delta r$ and $r_3$ changes with a period p in the longitudinal direction between first and second values each comprising a level distance $d_F$, and wherein the change occurs over a transition distance $d_T$ such that $d_T/d_F < 0.1$ and wherein the Brillouin frequency shift $\Delta f$ changes over each period by an amount $\delta[\Delta f]$ that is at least 10 MHz.

Another aspect of the disclosure is the optical fiber described above, wherein at least one of $r_1$, $r_2$, $\delta r$ and $r_3$ changes between first, second and third values over the period p.

Another aspect of the disclosure is the optical fiber described above, wherein $0 < d_T/d_F < 0.01$.

Another aspect of the disclosure is the optical fiber described above, wherein $0 < d_T/d_F < 0.001$.

Another aspect of the disclosure is the optical fiber described above, wherein the period p is equal to or greater than 0.5 km.

Another aspect of the disclosure is the optical fiber described above, wherein the period p is in the range from 0.5 km ≤ p ≤ 5 km.

Another aspect of the disclosure is the optical fiber described above, further comprising a mode field diameter (MFD) in the range from 9 µm to 11 µm at a wavelength of 1550 nm.

Another aspect of the disclosure is the optical fiber described above, wherein $\delta[\Delta f]$ is at least 20 MHz.

Another aspect of the disclosure is the optical fiber described above, wherein $\delta[\Delta f]$ is at least 40 MHz.

Another aspect of the disclosure is the optical fiber described above, wherein $\delta[\Delta f]$ is in the range 10 MHz ≤ $\delta[\Delta f]$ 62.5 MHz.

Another aspect of the disclosure is the optical fiber described above, wherein $r_1$ and $r_2$ are constant and $r_3$ varies with the longitudinal direction.

Another aspect of the disclosure is the optical fiber described above, wherein $r_1$ and $r_3$ are constant and $r_2$ varies with the longitudinal direction.

Another aspect of the disclosure is Brillouin fiber-based sensor system that includes: the optical fiber as described above and that also includes a first light source optically coupled to the optical fiber and configured to generate Brillouin scattered light; a detector system; and a light-redirecting element optically coupled to the optical fiber and configured to redirect the Brillouin backscattered light to the detector system.

Another aspect of the disclosure is Brillouin fiber-based sensor system as described above and configured to perform one of: Brillouin optical time domain reflectometry (BOTDR), Brillouin optical time domain analysis (BOTDA) and Brillouin optical correlation domain analysis (BOCDA).

Another aspect of the disclosure is a method of making a single-mode optical fiber comprising a fiber longitudinal direction and a Brillouin frequency shift $\Delta f$. The method includes: a) forming a preform comprising a core section surrounded by a cladding section, wherein at least one of the core section and the cladding section comprises a width that varies with a preform longitudinal direction; b) drawing the preform to form the optical fiber to define a core region from the core section and a cladding region from the cladding section; and wherein:
  i. the core region comprises an inner core region immediately surrounded by an outer core region, the inner core region comprising a delta value of $\Delta_1$ and radius of $r_1$, and the outer core region comprising a delta value $\Delta_2 < \Delta_1$ and a radius $r_2 > r_1$ and an annular width $\delta r = r_2 - r_1$, wherein $r_2$ is in the range from 3 μm to 10 μm and $\delta r$ is in the range from 1 μm to 9 μm, and wherein $\Delta_1 - \Delta_2$ is in the range from 0.3% to 2%;
  ii. the cladding region immediately surrounding the outer core region and comprising a delta value of $\Delta_3 < \Delta_2$ and a radius $r_3 > r_2$, wherein $r_3$ is in the range from 100 to 150 μm; and
  iii. at least one of $r_1$, $r_2$, $\delta r$ and $r_3$ changes with a period p in the longitudinal direction between first and second values each comprising a level distance $d_F$, and wherein the change occurs over a transition distance $d_T$ such that $0 < d_T/d_F < 0.1$ and wherein the Brillouin frequency shift $\Delta f$ changes over each period by an amount $\delta[\Delta f]$ that is at least 10 MHz.

Another aspect of the disclosure is the method described above and further comprising forming the core section to have a width that varies in the preform longitudinal direction while the cladding section comprises a width that is substantially constant in the preform longitudinal direction.

Another aspect of the disclosure is the method described above and further comprising forming the core section to have a width that is substantially constant in the preform longitudinal direction while the cladding section comprises a width that varies in the preform longitudinal direction.

Another aspect of the disclosure is the method described above, wherein $\delta[\Delta f]$ is at least 20 MHz.

Another aspect of the disclosure is the method described above, wherein $\delta[\Delta f]$ changes by at least 40 MHz over each period p.

Another aspect of the disclosure is the method described above, wherein $0 < d_T/d_F < 0.01$.

Another aspect of the disclosure is the method described above, wherein $0 < d_T/d_F < 0.001$.

Another aspect of the disclosure is the method described above, wherein the period p is equal to or greater than 0.5 km.

Another aspect of the disclosure is the method described above, wherein the period p is in the range from 0.5 km ≤ p ≤ 5 km.

Another aspect of the disclosure is the method described above, wherein the optical fiber comprises a mode field diameter in the range from 9 μm to 11 μm at a wavelength of 1550 nm.

Another aspect of the disclosure is a method of making a single-mode optical fiber comprising a fiber longitudinal direction and a Brillouin frequency shift $\Delta f$. The method includes: a) forming a preform comprising a core section surrounded by a cladding section; b) drawing the preform by changing the fiber diameter with a period p along the fiber longitudinal direction to form the optical fiber to define a core region from the core section and a cladding region from the cladding section; and wherein:
  i. the core region comprises an inner core region immediately surrounded by an outer core region, the inner core region comprising a delta value of $\Delta_1$ and radius of $r_1$, and the outer core region comprising a delta value $\Delta_2 < \Delta_1$ and a radius $r_2 > r_1$ and an annular width $\delta r = r_2 - r_1$, wherein $r_2$ is in the range from 3 μm to 10 μm and $\delta r$ is in the range from 1 μm to 9 μm, and wherein $\Delta_1 - \Delta_2$ is in the range from 0.3% to 2%;
  ii. the cladding region immediately surroundings the outer core region and comprises a delta value of $\Delta_3 < \Delta_2$ and a radius $r_3 > r_2$, wherein $r_3$ is in the range from 100 to 150 μm; and
wherein at least one of $r_1$, $r_2$, $\delta r$ and $r_3$ changes with a period p in the longitudinal direction between first and second values each comprising level distance $d_F$, and wherein the change occurs over a transition distance $d_T$ such that $0 < d_T/d_F < 0.1$ and wherein the Brillouin frequency shift $\Delta f$ changes over each period by an amount $\delta[\Delta f]$ that is at least 10 MHz.

Another aspect of the disclosure is the method described above, wherein $\delta[\Delta f]$ is at least 20 MHz.

Another aspect of the disclosure is the method described above, wherein $\delta[\Delta f]$ is at least 40 MHz.

Another aspect of the disclosure is the method described above, wherein $0 < d_T/d_F < 0.01$.

Another aspect of the disclosure is the method described above, wherein $0 < d_T/d_F < 0.001$.

Another aspect of the disclosure is the method described above, wherein the period p is equal to or greater than 0.5 km.

Another aspect of the disclosure is the method described above, wherein the period p is in the range from 0.5 km ≤ p ≤ 5 km.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Figure 1:
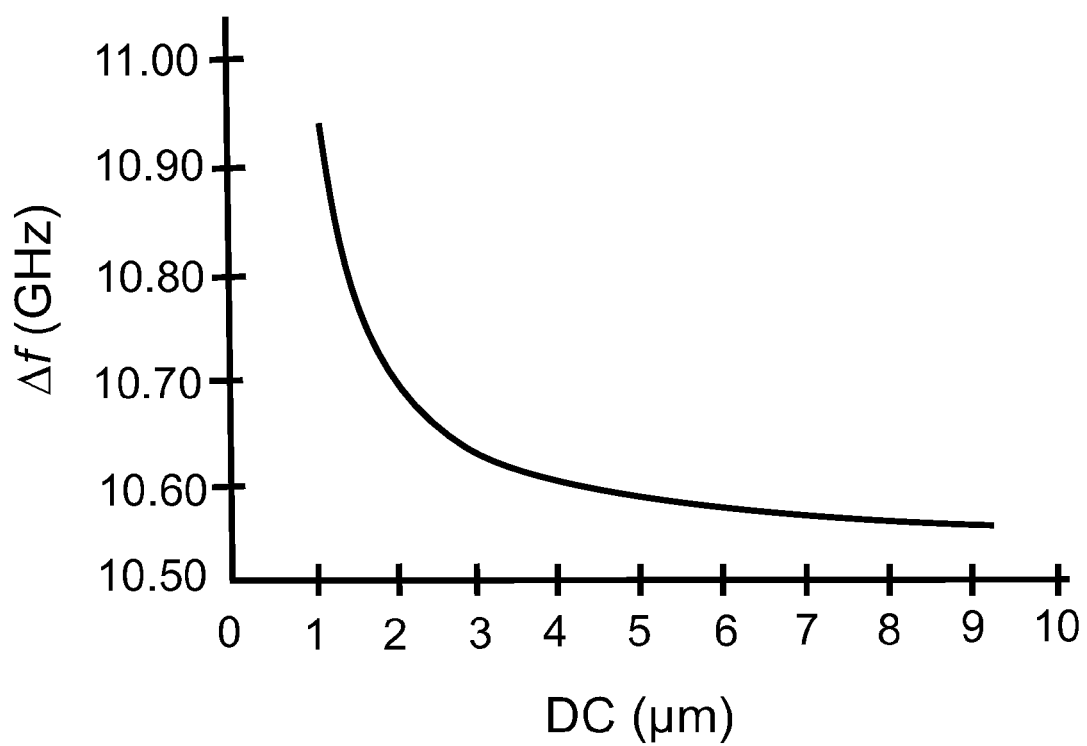
FIG. 1 is a plot of $\Delta f$ (GHz) versus the core diameter DC (μm) of a step-index fiber for the LP01 mode, the fiber having a 7.5% $GeO_2$ core and pure silica cladding, with the plot illustrating the dependence of the BFS sensitivity on the core size of an optical fiber.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Definitions

In the discussion below, "μm" stands for "micron" or micrometer.

The symbol "~" is used herein to mean "approximately."

The term "fiber" is short for optical fiber.

The "radial position" or the radial coordinate r refers to radial position relative to the central axis or centerline AC of the fiber at r=0.

The z-coordinate is used herein as a longitudinal or axial coordinate that runs the length of the fiber and that is coaxial with the central axis or centerline AC.

The Brillouin frequency shift is abbreviated herein as BFS and is denoted herein as Δf, and is a measure of the change in frequency of the light due to SBS as it propagates through the optical fiber as a guided wave. The amount of frequency shift Δf is thus measured relative to the frequency of the light inputted into the optical fiber.

The change in the Brillouin frequency shift Δf is denoted δ[Δf] and in the discussion below is measured as the difference between the maximum value of Δf and the minimum value of Δf within a given period p of the longitudinal variation in the refractive index profile, which in an example can be described as a longitudinal variation in the relative refractive index profile (defined immediately below).

The "relative refractive index," as used herein, is defined as:

$$\Delta_i \% = 100 \frac{(n_i^2 - n_{ref}^2)}{2n_i^2}$$

where $n_i$ is the maximum refractive index in region i, unless otherwise specified, and $n_{ref}$ is the refractive index of pure silica glass, unless otherwise specified. Accordingly, as used herein, the relative refractive index percent is relative to pure silica glass. As used herein, the relative refractive index is represented by Δ (or "delta") or Δ% (or "delta %") or %Δ and its values are given in units of "%", unless otherwise specified. Relative refractive index may also be expressed as Δ(r) or Δ(r)%.

For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions.

When the relative refractive index varies with radial position in a particular region of the fiber (i.e., when it varies laterally), it may be expressed in terms of its actual or approximate functional dependence or in terms of an average value applicable to the region. Unless otherwise specified, if the relative refractive index of a region (core region and/or any of the cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The term "α-profile" refers to a relative refractive index profile Δ(r) that has the following functional form:

$$\Delta(r) = \Delta(r_0)\left[1 - \left[\frac{|r - r_0|}{(r_1 - r_0)}\right]^\alpha\right]$$

where $r_o$ is the point at which Δ(r) is maximum, $r_2$ is the point at which Δ(r) is zero, and r is in the range $r_i \leq r \leq r_f$, where $r_i$ is the initial point of the α-profile, $r_f$ is the final point of the α-profile, and α is a real number and is called the alpha parameter or α-parameter, or just α.

The "mode field diameter" or "MFD" of an optical fiber is defined as:

MFD=2w, where $$w = \left[2\frac{\int_0^\infty (f(r))^2 r dr}{\int_0^\infty \left(\frac{df(r)}{dr}\right)^2 r dr}\right]^{1/2}$$

and where f(r) is the transverse component of the electric field distribution of the guided optical signal and r is radial position in the fiber. The MFD depends on the wavelength of the optical signal and is reported herein for wavelengths of 850 nm, 980 nm, 1060 nm and 1550 nm. Specific indication of the wavelength will be made when referring to an effective area $A_{eff}$.

The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. The cutoff wavelength is reported herein as a fiber cutoff wavelength or a cable cutoff wavelength and is denoted CC. The fiber cutoff wavelength is based on a 2-meter fiber length and the cable cutoff wavelength is based on a 22-meter cabled fiber length. The 22-meter cable cutoff wavelength is typically less than the 2-meter cutoff wavelength due to higher levels of bending and mechanical pressure in the cable environment.

The fibers disclosed herein generally include a core region and a cladding region surrounding the core region, as explained in greater detail below. The fibers may also include a primary coating surrounding the cladding region, and a secondary coating surrounding the primary coating.

It is assumed herein that the core region is substantially cylindrical in shape and that the surrounding cladding is substantially annular in shape unless otherwise noted. When two regions are directly adjacent to each other, the outer radius of the inner of the two regions coincides with the inner radius of the outer of the two regions.

As will be described further hereinbelow, the relative refractive indices Δ differ between the core and the cladding, and between the inner and outer core regions. Each of the regions may be formed from silica glass or a silica-based glass. Variations in refractive index may be accomplished by incorporating updopants or downdopants at levels known to provide a targeted refractive index or refractive index profile using techniques known to those of skill in the art.

Updopants are dopants that increase the refractive index of the glass relative to the undoped glass composition. Downdopants are dopants that decrease the refractive index of the glass relative to the undoped glass composition. Regions of variable refractive index may be formed through non-uniform spatial distributions of dopants.

The acronym OTDR stands for optical time domain reflectometry.

The acronym BOTDR stands for Brillouin optical time domain reflectometry.

The acronym BOTDA stands for Brillouin optical time domain analysis

The acronym BOCDA stands for Brillouin optical correlation domain analysis.

Variation of Δf with Fiber Core Diameter

FIG. 1 is a plot of Δf (GHz) versus the core diameter DC (μm) for the LP01 mode for a step-index profile fiber with a 7.5% $GeO_2$ core and a pure silica cladding. The plot illustrates the dependence of the BFS sensitivity on the core size of an optical fiber. The plot shows that for a standard single mode fiber with core diameter DC of about 9 μm, a 1 μm change in core diameter only produces about a 2 MHz change in the BFS. Even at a core diameter DC of only 5 μm, a 1 μm the change in the core diameter BFS is still relatively small as compared to the same amount of change for core diameters DC of 2 μm or 3 μm.

Considering that the 3 dB spectral width of the Brillouin gain spectrum of a standard single mode optical fiber is about 20 MHz, a BFS change on the order of 2 MHz or even 5 MHz is too small for most applications. Therefore, the approach to managing BFS in an optical fiber simply by changing the core size is not a suitable approach for standard single mode fibers with conventional fiber profiles and core diameters greater than about 5 μm.

BSF-Managed Fiber

Figure 2A:
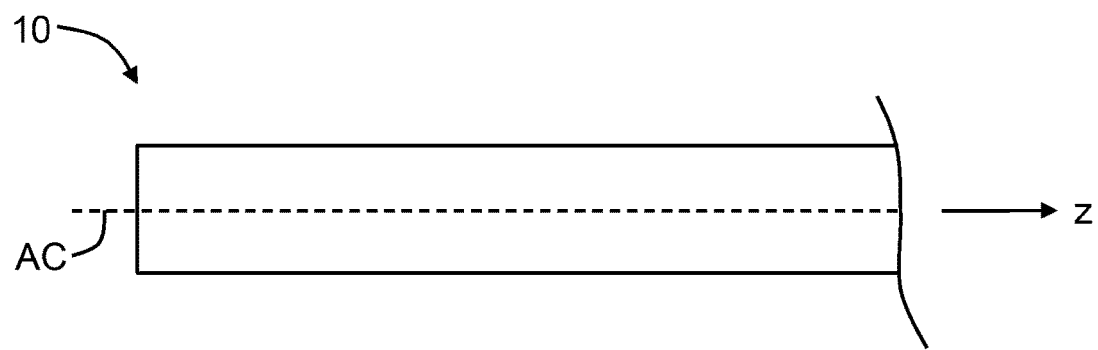
FIG. 2A is a side view and FIG. 2B is a cross-sectional view of an example BFS-managed optical fiber as disclosed herein.
Figure 2B:
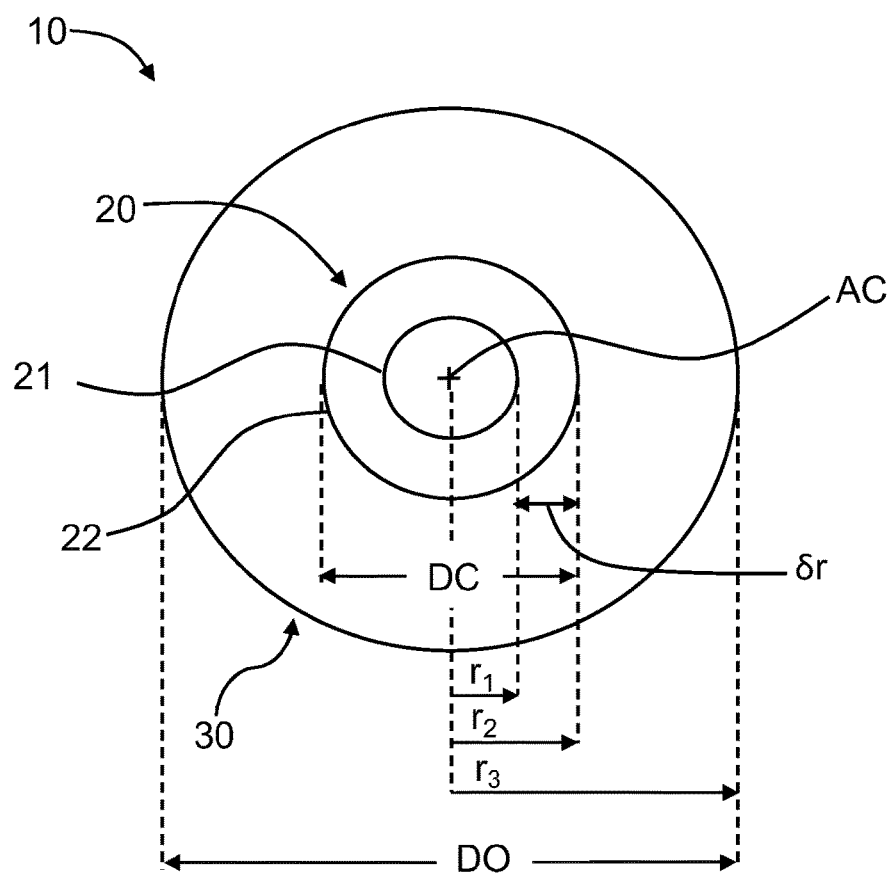

FIG. 2A is a side view and FIG. 2B is a cross-sectional view of an example BFS-managed fiber ("BFSM fiber") 10 as disclosed herein. The BSFM fiber 10 includes a segmented core region ("core") 20 and a cladding region ("cladding") 30 that surrounds the core. The core 20 includes an inner core region ("inner core") 21 immediately surrounded by an outer core region ("outer core") 22. The BSFM fiber 10 includes a central axis AC that runs down the center of core 20 in the longitudinal direction z. The radial dimension is represented by r. The inner core 21 has a radius $r_1$ and the outer core 22 has a radius $r_2$. The cladding 30 has a radius $r_3$. The BSFM fiber 10 has an outer diameter $DO=2r_3$ and a core diameter $DC=2r_2$. The outer core 22 thus has a radial width $\delta r=r_2-r_1$.

Figure 3:
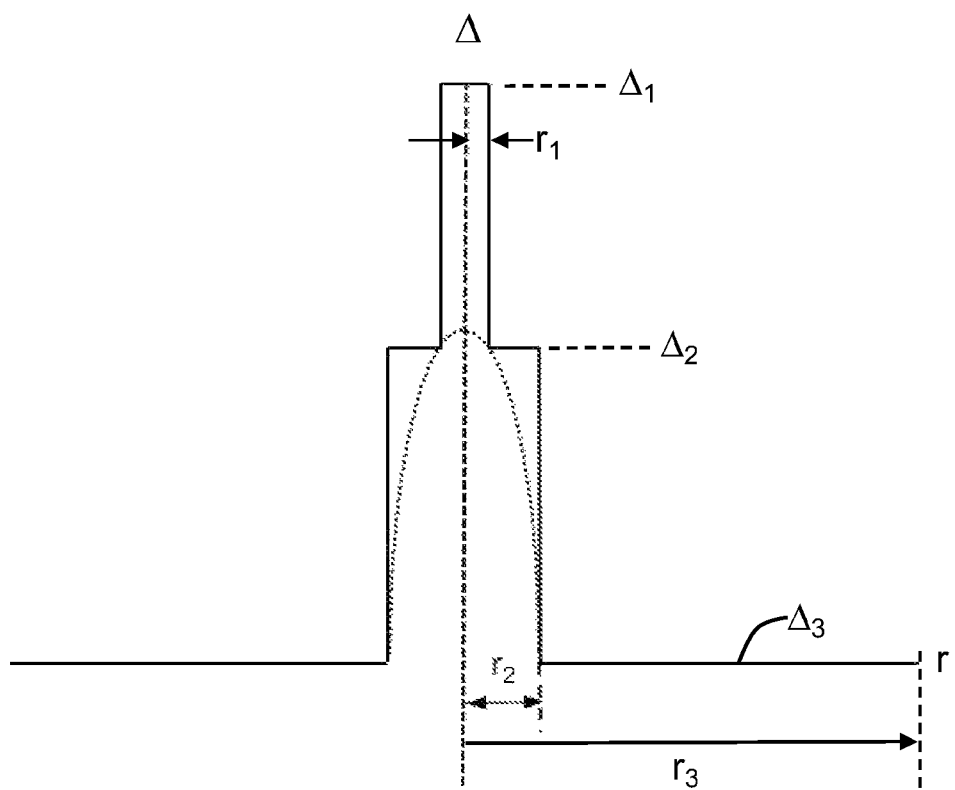
FIG. 3 is a generalized plot of the relative refractive index or "delta value" $\Delta$ versus radius r for an example BFS fiber as disclosed herein at a longitudinal distance z along the length of the fiber.

FIG. 3 is a generalized plot of the relative refractive index or "delta value" Δ versus radius r for BSFM fiber 10 illustrating an example delta value profile at a longitudinal distance z along the length of the fiber. The inner core 21 has delta value of $\Delta_1$ while the outer core 22 has a delta value of $\Delta_2$, wherein $\Delta_1>\Delta_2$. The delta value of cladding 30 is $\Delta_3$ and in an example the delta value Δ is generally defined so that $\Delta_3=0$ for convenience and by way of example. Thus, the delta value profile for BSFM fiber 10 can be described by four parameters: $r_1$, $r_2$, $\Delta_1$ and $\Delta_2$.

Without being bound by any particular theory, it is believed that smaller inner core 21 serves to confine the lower order acoustic modes (waves) traveling in BSF fiber 10. Since the amount of BFS is determined by the extent of the acoustic mode, the smaller diameter $2r_1$ of inner core 21 can significantly enhance the sensitivity of the BFS to the fiber core diameter change. Meanwhile, the optical field that propagates down the BSFM fiber 10 is mainly confined by the outer core 22 so that the fiber MFD can have a size similar to that of standard single-mode fibers, i.e., of about 9 μm to 11 μm at 1550 nm.

In an example, the relative index change δ between inner core 21 and outer core 22 i.e., $\delta=\Delta_1-\Delta_2$, is between 0.3% to 2%, and more preferably is between 0.5 to 1%. In an example, the relative index $\Delta_1$ of outer core 21 is between 0.5 to 2.6%, more preferably between 0.7% to 1.6%. In an example, the inner core radius $r_1$ is between 0.1 μm to 3 μm, and more preferably between 0.5 μm to 2 μm. Also in an example, the relative index $\Delta_2$ of outer core 22 is between 0.2 to 0.6%, and more preferably between 0.3% to 0.5%.

Further in an example, the outer core radius $r_2$ is in the range between 3 μm to 10 μm, more preferably between 4 μm to 9 μm. FIG. 3 shows the ideal step changes in the relative index profile. It is understood that graded index profiles (dashed line in FIG. 3) can be used to achieve similar optical performance. In an example, the radial width δr of outer core 20 is in the range from 1 μm to 9 μm or in the range from 3 μm to 7 μm.

Besides the radial or "lateral" profile, BSFM fiber 10 also has a longitudinal profile where the characteristics of the BFSM fiber change as a function of length or z-coordinate (i.e., along the z-direction). The longitudinal profile can include delta value changes, changes in the size of core 20 and changes in the size of cladding 30. In an example, $r_1$ changes with a period p. In another example, $r_3$ changes with a period p. In an example, δr changes with a period p while in another example $r_3$ (and thus the outer diameter DO) changes with a period p. In an example, both δr and DO can change over a period p. In examples, the period p is in the range 0.25 km≤p≤5 km or is in the range from 0.5 km≤p≤5 km or is in the range from 0.5 km≤p≤2 km.

Figure 4A:
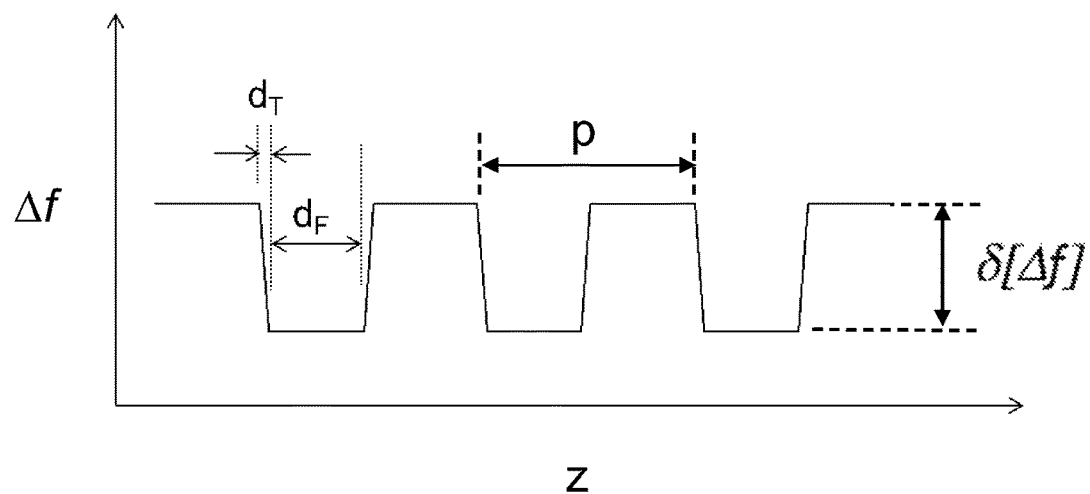
FIGS. 4A and 4B are two example plots of $\Delta f$ (arbitrary units) versus the longitudinal distance z (arbitrary units) for two example BFS-managed optical fiber having different longitudinal geometries (profiles)
Figure 4B:
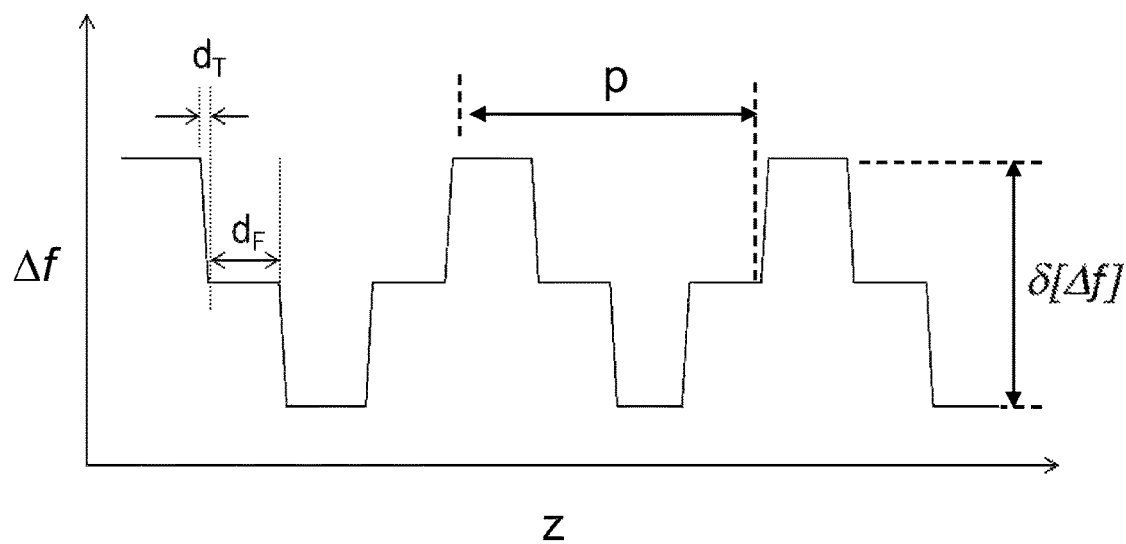

FIGS. 4A and 4B are two example plots of Δf (arbitrary units) versus z (arbitrary units) for two example BFS fibers 10 with different longitudinal geometries (profiles). In the profile of FIG. 4A, Δf periodically changes over a period p between two different levels $Δf_1$ and $Δf_2$. The transition distance between the two levels $Δf_1$ and $Δf_2$ is $d_T$, the distance for each level ("level distance") is $d_F$ and in an example is about half the period p ($p=d_F+d_T$) of the Δf cycle. In an example, $d_T>0$ and $d_F>0$. In an example, $d_T$ is made as small as possible based on fiber manufacturing considerations and in particular limitations related to the drawing of optical fibers that typically do not allow for sharp transitions in the lateral and longitudinal refractive index profiles of the optical fiber. In examples, $d_T$ can be as small as about 10 centimeters (cm) or 25 cm or 50 cm or 1 meter.

In the design shown in 4B, Δf periodically changes between three levels $Δf_1$, $Δf_2$ and $Δf_3$. Again, the transition distance between two levels is $d_T$ and the level distance is $d_F$. In general, there can be two or more Δf levels.

In an example, the ratio of $d_T/d_F$ is greater than zero while also preferably less than 0.2, more preferably less than 0.1, more preferably less than 0.01, even more preferably less than 0.001. The variation of Δf at each level (i.e., over the distance $d_F$) is preferred less than 5 MHz, more preferably less than 4 MHz, even more preferably less than 3 MHz. Since $d_F$~p/2 when dT is small, the ratio $d_T/d_F$~$2d_T/p$ so that the ratio $d_T/p$ is greater than zero while also preferably less than 0.05 or more preferably less than 0.005 or more preferably less than 0.0005.

Figure 5A:
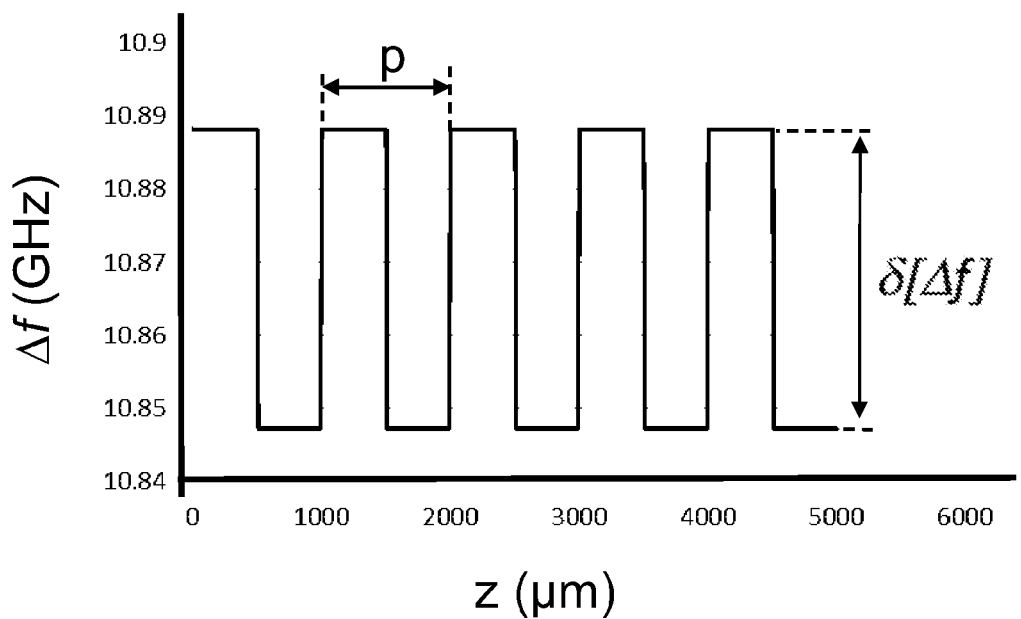
FIGS. 5A and 5B are plots similar to FIGS. 4A and 4B and show Δf (GHz) versus z (m) for two example BFS-managed optical fibers with different longitudinal geometries (profiles)
Figure 5B:
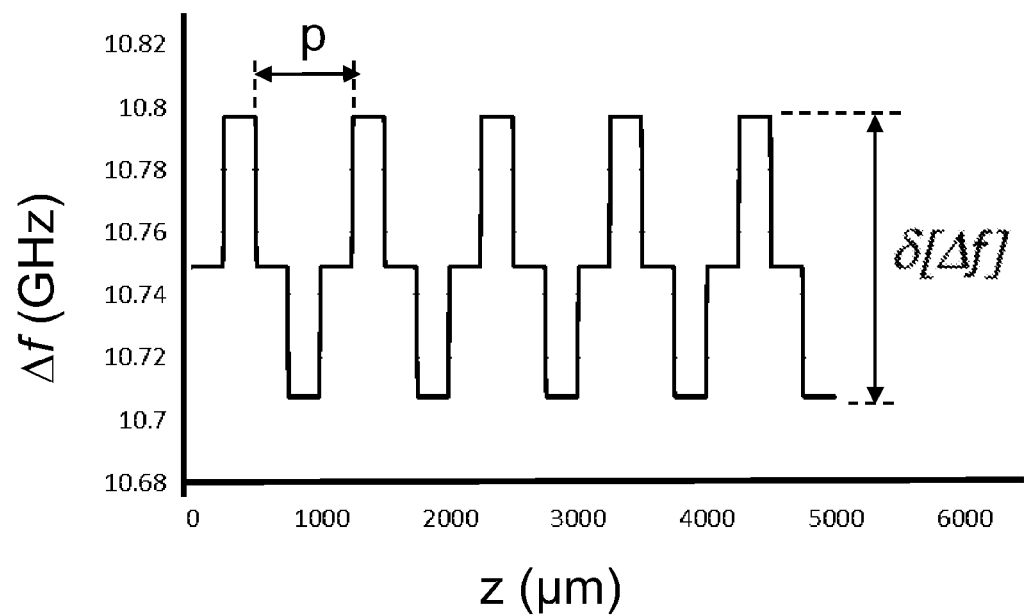

FIGS. 5A and 5B are similar to FIGS. 4A and 4B and show plots of Δf (GHz) versus z (m) based on simulations for two example BFS fibers 10 having different longitudinal geometries (profiles). The Δf profile of FIG. 5A has two Δf levels, namely an upper level $Δf_1$ of just under 10.89 GHz and a lower level $Δf_2$ of just under 10.85 GHz. The period of the longitudinal variation is denoted p. The BSFM fiber 10 associated with the Δf profile of FIG. 5A has an inner core delta $Δ_1=0.6\%$, and an outer core delta $Δ_2=0.29\%$. The upper level $Δf_1$ corresponds to an inner core radius $r_1=0.86$ μm, and an outer core radius $r_2=4.17$ μm while the lower level $Δf_2$ corresponds to an inner core radius $r_1=1.17$ μm, and an outer core radius $r_2=5.67$ μm. The difference $Δf_1-Δf_2$ is 41 MHz. The period p of the Δf plot is 1 km, with each Δf segment having a distance $d_F=0.5$ km. Thus, $d_F=p/2$.

The Δf profile of FIG. 5B has three Δf levels, namely an upper level $Δf_1$ of just under 10.8 GHz, an intermediate or middle level $Δf_2$ of just under 10.75 GHz and a lower level $Δf_3$ of just over 10.7 GHz. The inner core delta $Δ_1=1\%$, and the outer core delta $Δ_2=0.31\%$. The upper level $Δf_1$ corresponds to an inner core radius $r_1$ of 0.44 μm and an outer core radius $r_2$ of 4.14 μm. The intermediate or middle level $Δf_2$ corresponds to an inner core radius $r_1=0.50$ μm and an outer core radius $r_2=4.70$ μm. The lower level $Δf_3$ corresponds to an inner core radius $r_1=0.56$ μm and an outer core radius $r_2$ of 5.26 μm. The difference between $Δf_1$ and $Δf_3$ is 48 MHz. The period of the Δf plot is 1 km, with each Δf segment having a distance $d_F=0.25$ km.

In an example, the range for the change in $r_1$ (or $r_2$) is from 0.5% to 10% of $r_1$ (or $r_2$), and the range on the change in $r_3$ is from 1% to 15% of $r_3$. The range of the value for Δf is from 10 MHz to 900 MHz. The frequency difference in Δf between levels (e.g., as measured between $Δf_1$ and $Δf_2$ or between $Δf_1$ and $Δf_3$) over a given period p is denoted as δ[Δf], as illustrated in FIGS. 4A, 4B and 5A, 5B). in an example, δ[Δf], is at least 10 MHz, in another example is at least 20 MHz, in another example is at least 25 MHz, in another example is at least 30 MHz, in another example is at least 40 MHz and in another example is at least 45 MHz. In one example, δ[Δf] is in the range from 10 MHz to 70 MHz while in another example is in the range from 10 MHz to 62.5 MHz while in another example is in the range from 10 MHz to 50 MHz.

Example Brillouin Fiber-Based Sensor Systems

Example fiber-based sensor systems 100 that employ the BSFM fiber 10 disclosed herein and are illustrated schematically in FIGS. 6A, 6B, 7A, 7B and 8. In these fiber-based sensor systems, BSFM fiber 10 is used as a sensing fiber to enhance the performance of a sensor system, such as sensing distance, sensing sensitivity, or/and sensing accuracy.

Generally speaking, a continuous increase or decrease of the BFS along a fiber is understood in the art as being the most efficient way to increase or suppress stimulated Brillouin scattering (SBS) in a fiber. Unfortunately, such a fiber configuration is not suitable for the various types of Brillouin fiber-based sensor systems. In a BOTDR system for example, such a fiber can cause the degradation of the sensing sensitivity or/and the sensing accuracy. In a BOTDA system, such a fiber can result in a longer acquisition time because a larger scan range of the frequency of the probe light is required. In addition, it can also degrade the sensing sensitivity or/and the sensing accuracy. In a BOCDA system, modulation parameters (amplitude and frequency) of a light source are chosen such that only a single correlation peak lies within the sensing fiber. The continuous increase or decrease of the BFS along a fiber results the reducing of sensing distance, and degrades the sensing sensitivity or/and the sensing accuracy. Thus, the continuous increase or decrease of the BFS along a fiber reduces the sensing distance and degrades the sensing sensitivity or/and the sensing accuracy of a Brillouin fiber-based sensor system.

Example Brillouin fiber-based sensor systems are described below that employ the BSF fiber 10 disclosed herein to enhance the performance of the sensor system, such increasing the sensing distance, sensing sensitivity, or/and the sensing accuracy.

1) Generalized Brillouin Fiber-Based Sensor System

Figure 6:
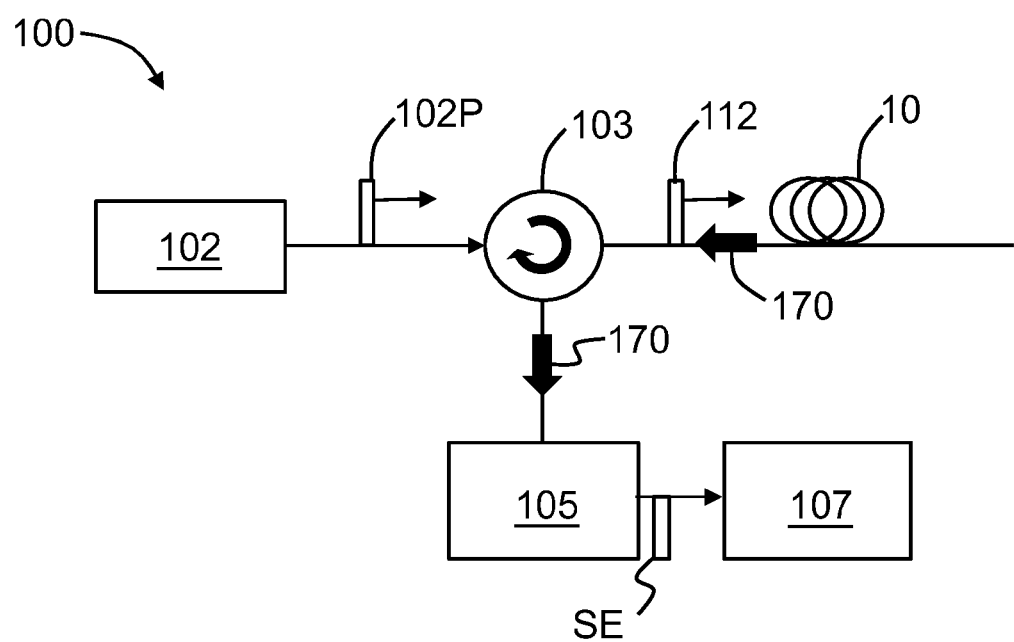
FIG. 6 is a generalized schematic diagram of a Brillouin fiber-based sensor system that utilizes the BFS-managed optical fiber as disclosed herein.

FIG. 6 is a schematic diagram of a generalized Brillouin fiber-based sensor system ("system") 100. The system 100 includes a light source 102 optically coupled to BFSM fiber 10 by a light-redirecting element 103 that is optically coupled to a detector system 105. The detector system 105 can be an optical coherent receiver that includes a photodetector and a local oscillator. The detector system 105 is electrically connected to an electrical signal processor 107.

The light source 102 generates light pulses 102P that travel to BFSM fiber 10 and generate therein Brillouin backscattered light 170. The light-redirecting element 103 redirects the Brillouin backscattered light 170 to detector system 105. The detector system 105 generates an electrical signal SE that is received and processed by the electrical signal processor 107 to extract information from the Brillouin backscattered light 170. This information can include temperature information, strain information, etc.

2) BOTDR System

Figure 7A:
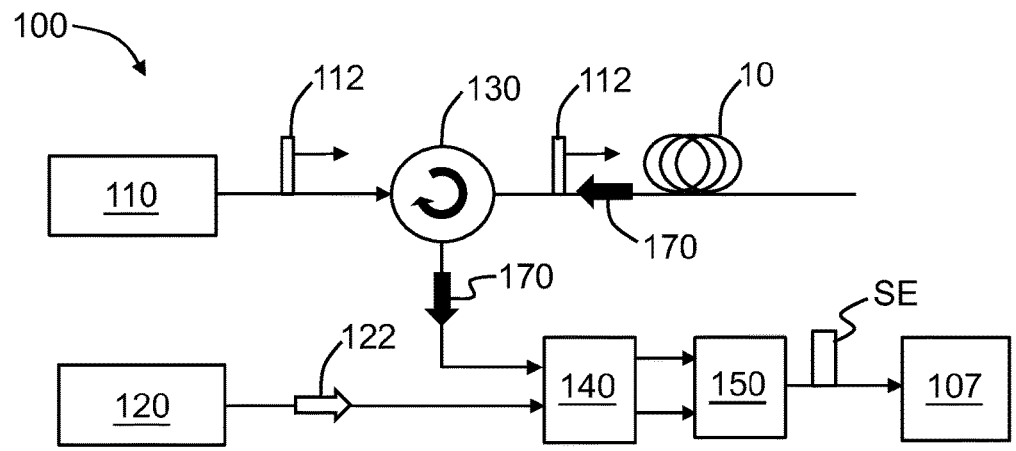
FIGS. 7A and 7B are schematic diagrams of two example BOTDR sensor systems that employ the BFS-managed optical fiber disclosed herein.
Figure 7B:
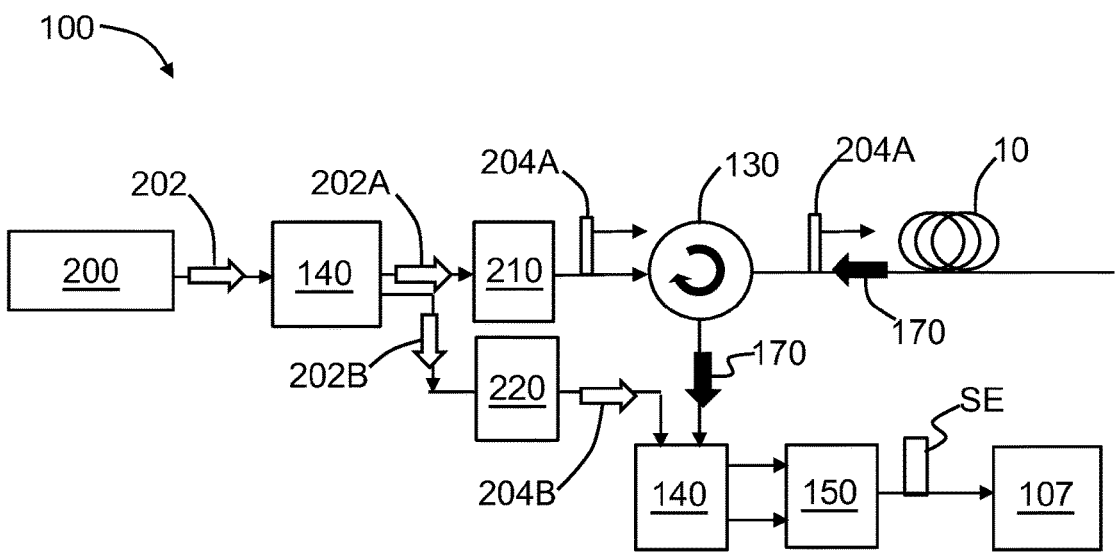

The example systems 100 shown FIGS. 7A and 7B are configured as a BOTDR system. The system 100 of FIG. 6A includes a pump laser 110, a local oscillator 120, an optical circulator ("circulator") 130, an optical coupler 140, an optical coherent receiver 150 and an electrical signal processor 160.

The pump laser 110 is optically coupled to circulator 130, which is optically coupled to a section of BSFM fiber 10. The circulator 130 is also optically coupled to optical coupler 140. The local oscillator 120 is also optically coupled to optical coupler 140, which in turn is optically coupled to optical coherent receiver 150.

The pump laser 120 generates and launches pulses of light ("pump pulses") 122 of frequency $f_0$ that travel to circulator 130 and into BSFM fiber 10. The pump pulses 122 give rise to Brillouin backscattered light 170 that has a frequency $f_0-f_B$, which includes temperature or strain information. The Brillouin backscattered light 170 travels to circulator 130 and is directed to optical coupler 140.

Meantime, local oscillator 120 generates narrow-linewidth continuous-wave (CW) light 112 of frequency $f_L$. The light 122 travels to optical coupler 140 where it mixes with Brillouin backscattered light 170 and is received by optical coherent receiver 150 as a mixed optical signal. The electrical output of optical coherent receiver 150 is an electrical signal SE that is analyzed by electrical signal processor 107 to extract the temperature or strain information.

FIG. 7B is similar to FIG. 7A and shows a second example BOTDR sensor system 100. In system 100 of FIG. 7B, there is a single continuous-wave (CW) laser 200 optically coupled to a first optical coupler 140. The first optical coupler is optically coupled to an optical modulator 210, which in turn is optically coupled to a circulator 130. The circulator 130 is optically coupled to a section of BSFM fiber 10 and is also optically coupled to a second optical coupler 140. The first optical coupler 140 is also optically coupled to a frequency shifter 220, which in turn is optically coupled to the second optical coupler. The second optical coupler 140 is optically coupled to optical coherent receiver 150, which is electrically connected to electrical signal processor 107.

The CW laser outputs CW light 202 at frequency $f_0$. The CW light 202 travels to first optical coupler 140, which splits the CW light 202 into two light portions 202A and 202B. The first light portion 202A travels to optical modulator 210, which modulates the first light portion to form pump light pulses 204A. The pump light 204A travels through circulator 130 to BSF 10. The pump light pulses 204A traveling in BSF 10 generate Brillouin backscattered light 170 that travels to circulator 130 and is directed to second optical coupler 140 and then to optical coherent receiver 150. Meantime, the second CW light portion 202B is directed to a frequency shifter 220 (e.g., a phase modulator), which shifts the frequency of the CW light portion by $f_B$ to form frequency shifted CW light 204B having a frequency $f_L \sim f_0-f_B$. This frequency-shifted CW light 204B travels to second optical coupler 140 and is combined with Brillouin backscattered light 170 at optical coherent receiver 150, which detects the two light signals and generates in response an electrical signal SE that is analyzed by electrical signal processor 107.

3) BOTDA System

Figure 8A:
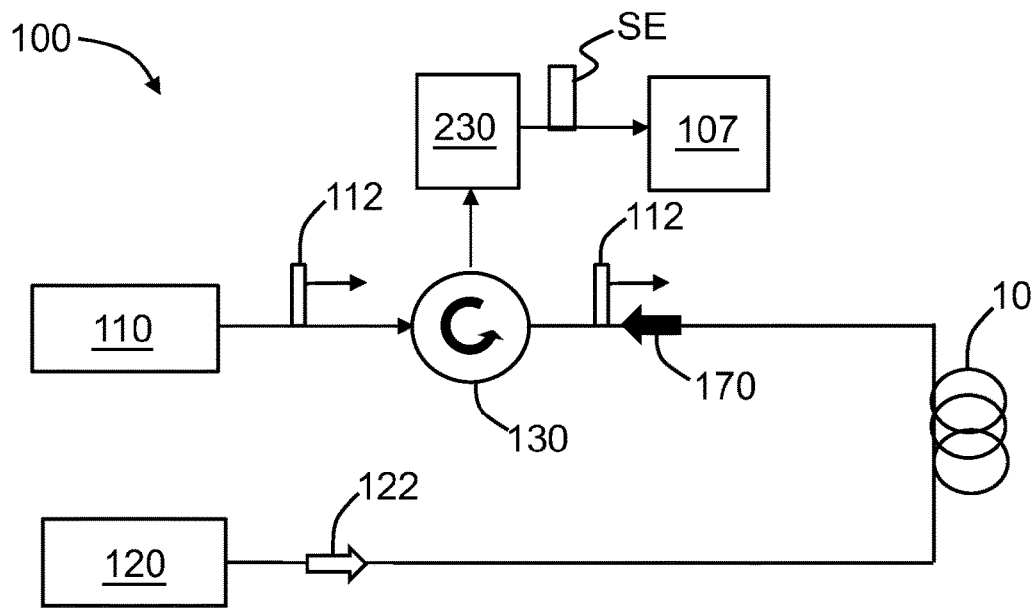
FIGS. 8A and 8B are schematic diagrams of two example BOTDA sensor systems that employ the BFS-managed optical fiber disclosed herein.
Figure 8B:
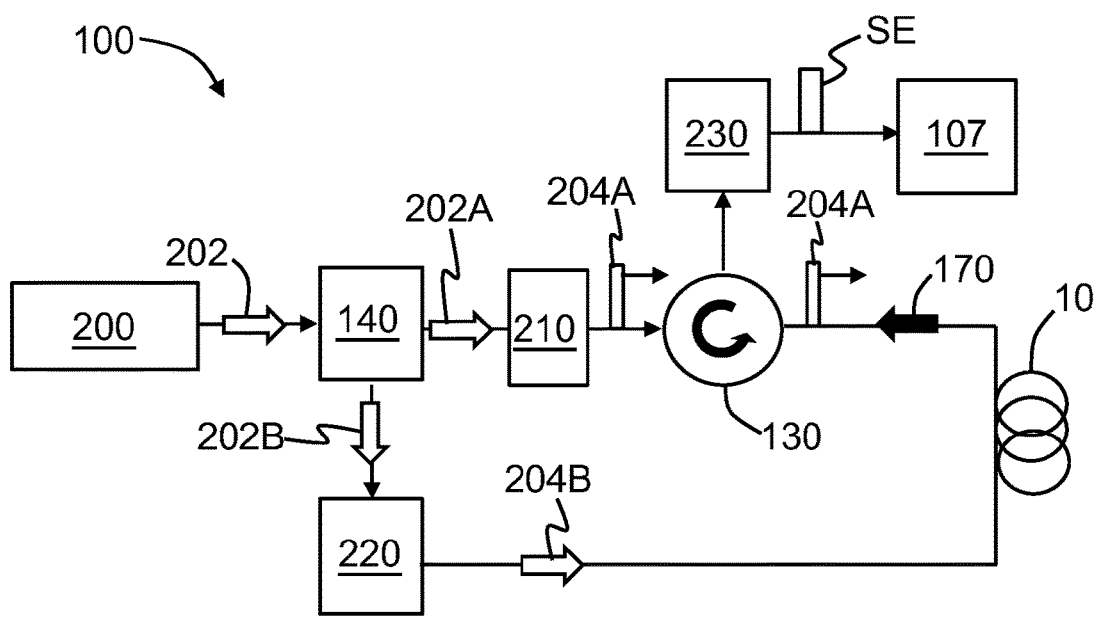

FIGS. 8A and 8B are schematic diagrams of example BOTDA sensor systems 100. The system 100 of FIG. 8A includes a pump laser 110, a probe laser 120, a circulator 130, a photodetector 230 and an electrical signal processor 107. The probe laser 110 is optically coupled to circulator 130 via a section of BSFM fiber 10, which is also optically coupled to the circulator. The photodetector 230 is also optically coupled to circulator 130 and is electrically connected to electrical signal processor 150.

The pump laser 110 generates and launches pulses of light ("pump pulses") 112 of frequency $f_0$ that travel to circulator 130 and then into BSFM fiber 10. Meantime, the probe laser 110 generates CW probe light 112 of frequency $f_p=f_0-f_B$ that also travels over BSFM fiber. The probe CW light 122 is amplified by the pump pulses 112 through the stimulated Brillouin scattering process in BSFM fiber 10. The amplified probe light 170 that has a frequency $f_0-f_B$ includes temperature or strain information. The amplified probe light 170 travels to circulator 130 and is directed to photodetector 230. The out electrical signal SE from photodetector 230 is then analyzed by an electrical signal processor 107.

FIG. 8B is another embodiment of BODTA system 100 similar to system 100 of FIG. 7B, except that the pump and probe share the same CW laser 200. The output of the CW laser 200 is split into two parts by an optical coupler 140. One part is for pump light 202A. An optical intensity modulator 210 is used to convert this pump light 202A into pump pulses 204A. Another part is for the probe light 202B. An optical frequency shifter 220 (such as, for example, an optical phase modulator) is used to shift the frequency of this part light 202B from $f_0$ to $f_p=f_0-f_B$.

4) BOCDA System

Figure 9:
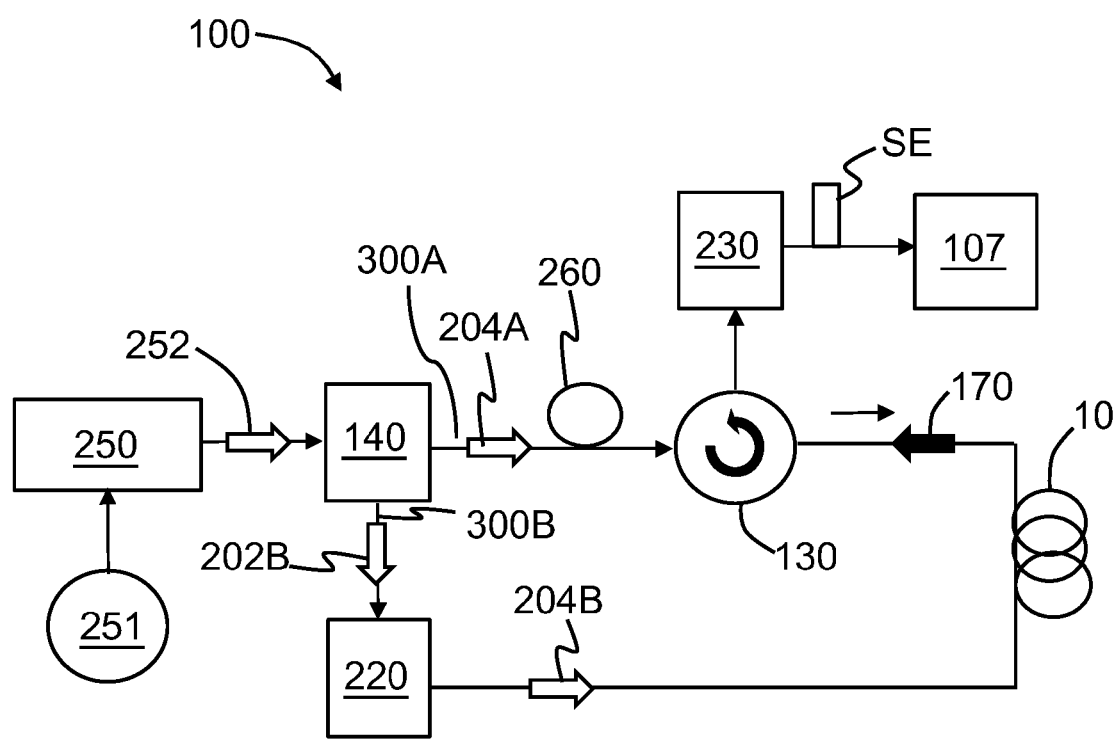
FIG. 9 is a schematic diagram of an example BOCDR sensor system that employs the BFS-managed optical fiber disclosed herein.

FIG. 9 is a schematic diagram of an example BOCDA sensor system 100. System 100 of FIG. 8 includes a distributed feedback (DFB) laser 250 optically connected to an optical coupler 140 and an input end. The DFB laser 250 is driven by a frequency modulator 251. A first branch 300A of the output end of optical coupler 140 is connected to a delay fiber 260, which in turn is connected to a circulator 130. The BSFM fiber 10 is connected to the circulator. A photodetector 230 is optically connected to circulator 130, and the photodetector is electrically connected to electrical signal processor 160. A second branch 300B of the output end of optical coupler 140 is optically connected to a frequency shifter 220, which in turn is optically connected to BSFM fiber 10.

The DFB laser 250 generates CW light 252 of frequency $f_0$. The CW light 252 is split by optical coupler to form two light portions 204A and 204B. The first light portion 204A travels over first branch 300A and serves as the pump light. The pump light 204A travels through delay fiber 260 and to circulator 130. The pump light 202A travels through circulator 130 to BSFM fiber 10 and interacts with the probe light 204B generates the correlation signal 170, which travels back to circulator 130 and is directed to photodetector 230.

Meantime, second light portion 202B travels over branch 300B to frequency shifter 220, which generates probe light of frequency $f_p=f_0-f_B$ that travels over the BSFM fiber 10 to circulator 130 and then to photodetector 230. The correlation signal of the continuous probe and pump lights through the SBS process is detected by a photodetector. The output electrical signal SE from photodetector 230 is then analyzed by an electrical signal processor 107.

The frequency shift $\Delta f$ is measured by controlling the interference of the continuous probe beam and pump light pulses within BSFM fiber 10. The position is determined by scanning along the fiber. Since modulation parameters (amplitude and frequency) of a light source are chosen such that only a single correlation peak lies within the sensing fiber, to extend the measurement range, a fiber with step change of the BSF along the fiber is needed. The BFS should be different for different section in order to identify the sensing location. Meanwhile, the length of each section should be smaller than the maximum length which is determined by the required spatial resolution.

Experimental Results

Figure 10:
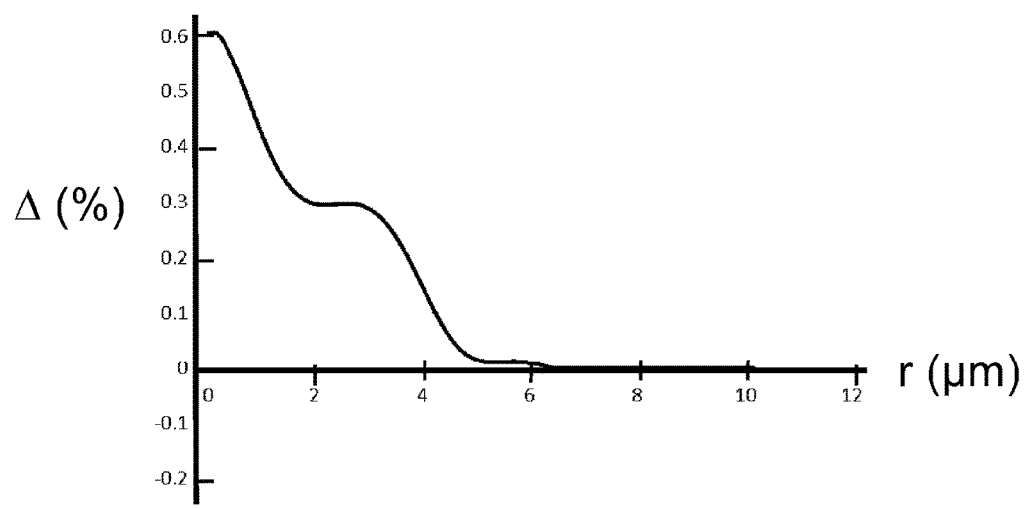
FIG. 10 is a plot of the relative refractive index Δ (%) versus radius r (μm) for an example BFS-managed optical fiber at a select longitudinal distance z and as fabricated using the methods disclosed herein.

An example BSFM fiber 10 was fabricated and experiments performed on the BFS fiber to confirm its SBS management capability. The BSFM fiber 10 was fabricated using a select preform and carrying out a drawing process in a manner that resulted in a change in the outer diameter DO of the fiber. FIG. 10 is a plot of the measured relative refractive index Δ (%) versus fiber radius r (μm) for the fabricated BSFM fiber 10 at a select longitudinal distance z. The inner core 21 had a graded index profile with $\Delta_1=0.605\%$ and a radius $r_1=1.85$ μm at the select longitudinal distance z. The outer core 22 had a step-like profile with $\Delta_2=0.3\%$ a radius $r_2=4.8$ μm. The fiber length was 2.98 km and had five distinct longitudinal sections. The radius $r_3$ of cladding 30 was varied so that the fiber outer diameter DO changed about every 0.6 km between 120 μm and 135 μm (i.e., $r_3$ varied between 60 μm and 67.5 μm). The transition distance $d_T$ was measured to be ~0.1 km and the level distance $d_F$ was measured to be ~0.6 km except at beginning and end sections of the fiber. Thus, the example BSFM fiber 10 had a value of $d_T/d_F$~0.166 for the central portion of the fiber.

Figure 11:
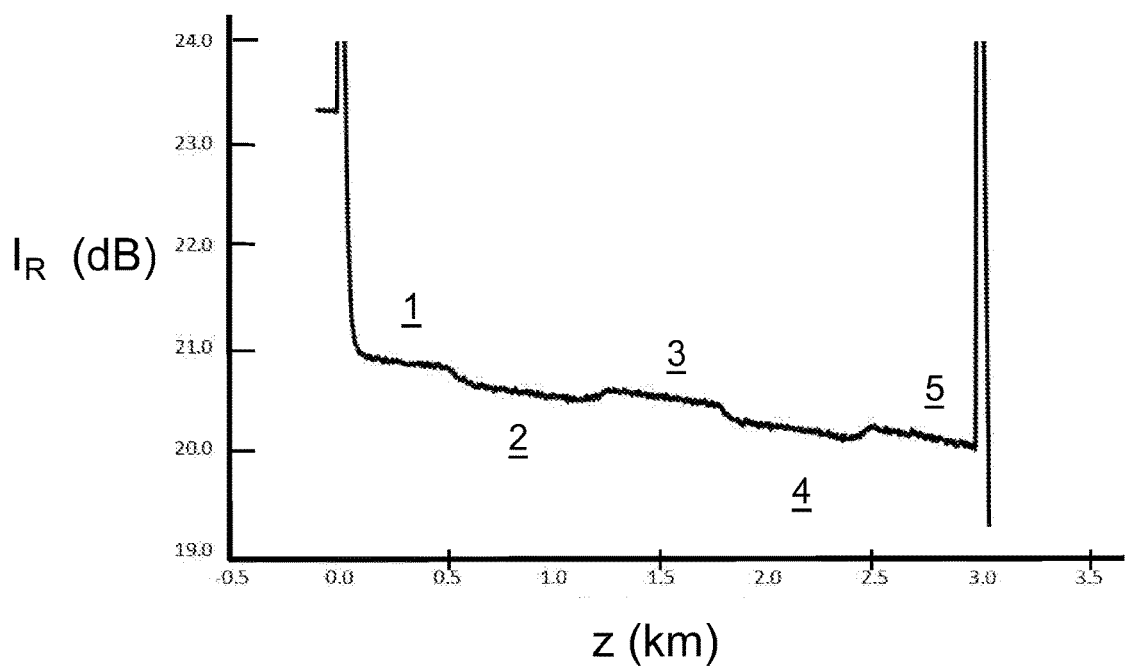
FIG. 11 is a plot of relative back-scattered intensity $I_R$ (dB) versus length L (km) of the example fabricated BFS-managed optical fiber of FIG. 9 for an example OTDR trace.

FIG. 11 is a plot of the measured relative back scattered intensity $I_R$ (dB) versus the length coordinate z (km) of the example BSFM fiber 10 discussed above for an example OTDR trace. The measured fiber loss at 1550 nm was 0.3 dB/km. The fiber cutoff and MFD of fiber sections with OD=135 μm are 1312 nm and 9.56 μm respectively, measured at 1550 nm.

The plot of FIG. 11 shows the five sections, denotes 1 through 5 respectively. The periodic change in the fiber outer diameter DO results in a periodic change in the measured relative intensity $I_R$. The measured intensity $I_R$ includes a corresponding periodic change δ[Δf] in the Brillouin frequency shift Δf between periods p as discussed below.

Figure 12:
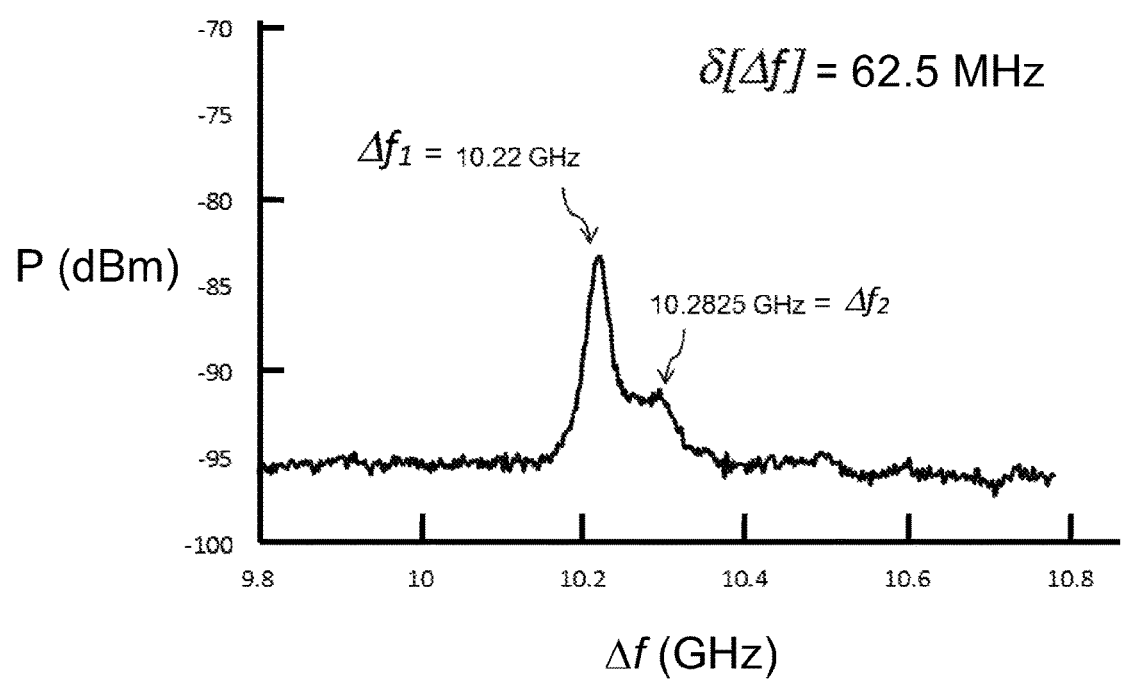
FIG. 12 is a plot of the measured optical power P (dBm) versus the Brillouin frequency shift Δf (GHz) and represents the measured Brillouin gain spectrum of the entire 2.98 km length of the example fabricated BFS-managed optical fiber.

FIG. 12 is a plot of the measured optical power P (dBm) versus frequency shift Δf (GHz) and represents the measured Brillouin gain spectrum of the entire 2.98 km length of the example BSFM fiber 10. Unlike the expected single Brillouin gain peak for standard SMF, the BFSM fiber had two Brillouin peaks at $\Delta f_1=10.22$ GHz and $\Delta f_1=10.2825$ GHz, with the difference between of the two peaks defining δ[Δf] and being about 65 MHz. The BFS peak at 10.22 GHz corresponds to the sections of BSFM fiber 10 having OD=135 μm, which are the sections identified as 1, 3, 5 in FIG. 11. The BFS peak at 10.28 GHz corresponds to the sections of BSFM fiber 10 having OD=120 μm, which are the sections identified as 2 and 4 in FIG. 11.

The sections (levels) of BSFM fiber 10 with OD=135 μm have a level distance $d_F$ of about 1.8 km while the sections (levels) of the BSFM fiber with OD=120 μm have a level distance $d_F$ of about 1.2 km. This results in the BFS peak at 10.28 GHz being smaller than that at 10.22 GHz. A 12% change in the outer diameter OD corresponds to about a 1 μm change in the diameter DC of core 20, so that a value of δ[Δf] of 62.5 MHz is achieved in a fiber with an MFD of about 9 μm. Comparing with the simple step-index profile design for a single-mode fiber, this represents about a 30× improvement in sensitivity of BFS to the change in the core diameter DC.

Methods of Forming BFSM Fiber

Techniques for drawing optical fibers are well known in the art. See, for example, DiMarcello et al., "Fiber Drawing and Strength Properties," Optical Fiber Communications, ed. T. Li, Vol. 1, Academic Press Inc., pages 179-248 (1985) (and the references cited therein), as well as U.S. Pat. No. 3,711,262, and U.S. Pat. No. 3,932,162, which are all incorporated by reference herein. Optical fiber drawing techniques typically utilize a glass preform having a scaled-up configuration as compared to the resulting drawn fiber.

The BSFM fiber 10 can be formed from a preform such as those described below by using standard optical fiber drawing methods known in the art as carried out on a standard optical fiber drawing apparatus.

One method of forming BSFM fiber 10 is to make a preform with an index profile as described above. Then the preform is drawn into an optical fiber by changing the fiber diameter from OD1 to OD2 with a period p during the drawing process.

Methods of forming BSFM fiber with substantially a constant fiber diameter are described below.

Figure 13A:
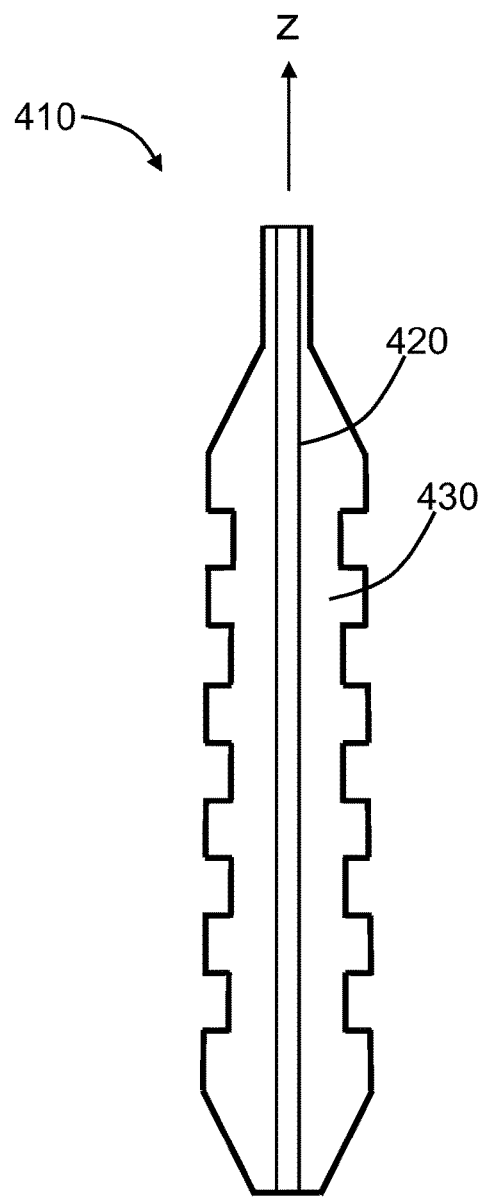
FIGS. 13A and 13B are schematic side views of example preforms that can be used to form the BFS-managed optical fibers disclosed herein using a standard optical fiber drawing process.

FIG. 13A is schematic side view of an example preform 410 having a core section 420 and a cladding section 430. The cladding section 430 is shown has having a periodic variation in its radius as function of the length L that runs in the z-direction, which can be thought of as a preform longitudinal direction or dimension. The resulting BSFM fiber 10 formed from preform 410 using standard optical fiber drawing techniques will have a configuration where the optical fiber diameter DO is controlled to be constant, for example 125 μm, resulting the diameter DC of core 20 changing periodically.

In an example, preform 410 of FIG. 13A can be made by machining a uniform glass preform to remove glass in desired locations. The outer preform diameter variation can also be made by machining a soot preform. The soot preform can then be processed (e.g., consolidated and sintered) to form a glass preform having the outer diameter variation as shown. During fiber draw, the fiber diameter DC (see FIG. 2B) is controlled to a substantially constant target value as a function of longitudinal dimension z by adjusting the draw parameters.

Figure 13B:
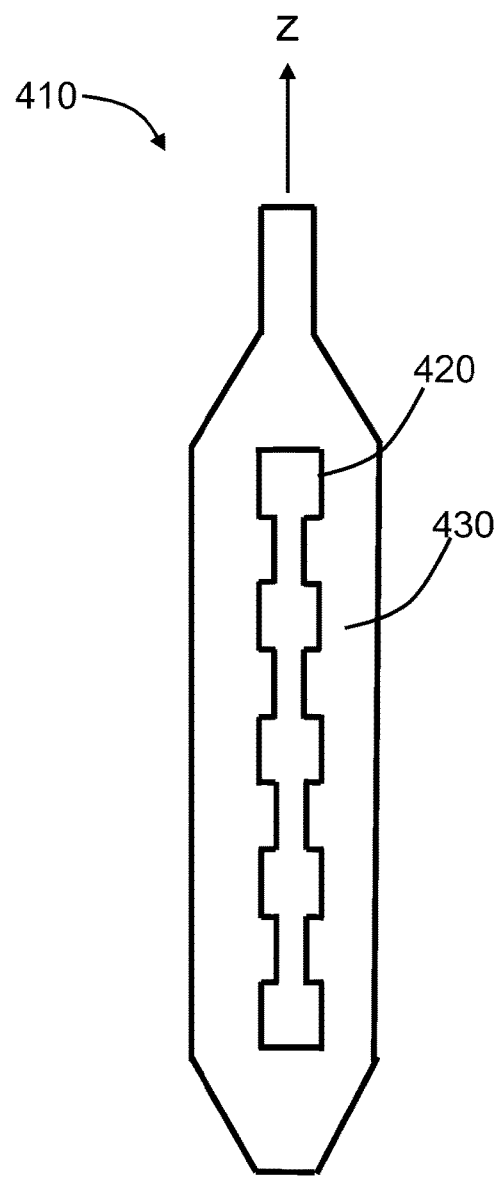

FIG. 13B shows another example preform 410 wherein the core section 420 has a radius that varies in the z-direction. In an example, the core section 20 is formed by machining a core cane to have the periodic structure as shown in FIG. 13B. The core cane is then overcladded (i.e., coated) using for example outside vapor deposition (OVD). The structure is then processed (e.g., consolidated and sintered) to form glass preform 410. In the example of FIG. 13B, the resulting preform 410 has an outer diameter OD that is substantially constant with longitudinal dimension z, which simplifies the fiber draw control process.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A single-mode optical fiber comprising a longitudinal direction and a Brillouin frequency shift Δf, comprising:
a core region comprising an inner core region immediately surrounded by an outer core region, the inner core region comprising a delta value of $\Delta_1$ and radius of $r_1$, and the outer core region comprising a delta value $\Delta_2<\Delta_1$ and a radius $r_2>r_1$ and an annular width $\delta r=r_2-r_1$, wherein $r_2$ is in the range from 3 μm to 10 μm and δr is in the range from 1 μm to 9 μm, and wherein $\Delta_1-\Delta_2$ is in the range from 0.3% to 2%;

a cladding region immediately surrounding the outer core region and comprising a delta value of $\Delta_3<\Delta_2$ and a radius $r_3>r_2$, wherein $r_3$ is in the range from 100 to 150 µm; and wherein at least one of $r_1$, $r_2$, $\delta r$ and $r_3$ changes with a period p in the longitudinal direction between first and second values each comprising a level distance $d_F$, and wherein the change occurs over a transition distance $d_T$ such that $d_T/d_F<0.1$ and wherein the Brillouin frequency shift $\Delta f$ changes over each period by an amount $\delta[\Delta f]$ that is at least 10 MHz.

2. The single-mode optical fiber according to claim 1, wherein at least one of $r_1$, $r_2$, $\delta r$ and $r_3$ changes between first, second and third values over the period p.

3. The single-mode optical fiber according to claim 1, wherein $0<d_T/d_F<0.01$.

4. The single-mode optical fiber according to claim 1, wherein $0<d_T/d_F<0.001$.

5. The single-mode optical fiber according to claim 1, wherein the period p is equal to or greater than 0.5 km.

6. The single-mode optical fiber according to claim 1, wherein the period p is in the range from 0.5 km≤p≤5 km.

7. The single-mode optical fiber according to claim 1, further comprising a mode field diameter (MFD) in the range from 9 µm to 11 µm at a wavelength of 1550 nm.

8. The single-mode optical fiber according to claim 1, wherein $\delta[\Delta f]$ is at least 20 MHz.

9. The single-mode optical fiber according to claim 1, wherein $\delta[\Delta f]$ is at least 40 MHz.

10. The single-mode optical fiber according to claim 1, wherein $\delta[\Delta f]$ is in the range 10 MHz≤$\delta[\Delta f]$≤62.5 MHz.

11. The single-mode optical fiber according to claim 1, wherein $r_1$ and $r_2$ are constant and $r_3$ varies with the longitudinal direction.

12. The single-mode optical fiber according to claim 1, wherein $r_1$ and $r_3$ are constant and $r_2$ varies with the longitudinal direction.

13. A Brillouin fiber-based sensor system, comprising:
the optical fiber according to claim 1;
a first light source optically coupled to the optical fiber and configured to generate Brillouin scattered light;
a detector system; and
a light-redirecting element optically coupled to the optical fiber and configured to redirect the Brillouin backscattered light to the detector system.

14. The Brillouin fiber-based sensor system according to claim 13, configured to perform one of: Brillouin optical time domain reflectometry (BOTDR), Brillouin optical time domain analysis (BOTDA) and Brillouin optical correlation domain analysis (BOCDA).

15. A method of making a single-mode optical fiber comprising a fiber longitudinal direction and a Brillouin frequency shift $\Delta f$, the method comprising:
a) forming a preform comprising a core section surrounded by a cladding section, wherein at least one of the core section and the cladding section comprises a width that varies with a preform longitudinal direction;
b) drawing the preform to form the optical fiber to define a core region from the core section and a cladding region from the cladding section; and
wherein:
iv. the core region comprises an inner core region immediately surrounded by an outer core region, the inner core region comprising a delta value of $\Delta_1$ and radius of $r_1$, and the outer core region comprising a delta value $\Delta_2<\Delta_1$ and a radius $r_2>r_1$ and an annular width $\delta r=r_2-r_1$, wherein $r_2$ is in the range from 3 µm to 10 µm and $\delta r$ is in the range from 1 µm to 9 µm, and wherein $\Delta_1-\Delta_2$ is in the range from 0.3% to 2%;

v. the cladding region immediately surrounding the outer core region and comprising a delta value of $\Delta_3<\Delta_2$ and a radius $r_3>r_2$, wherein $r_3$ is in the range from 100 to 150 µm; and vi. at least one of $r_1$, $r_2$, $\delta r$ and $r_3$ changes with a period p in the longitudinal direction between first and second values each comprising a level distance $d_F$, and wherein the change occurs over a transition distance $d_T$ such that $0<d_T/d_F<0.1$ and wherein the Brillouin frequency shift $\Delta f$ changes over each period by an amount $\delta[\Delta f]$ that is at least 10 MHz.

16. The method according to claim 15, further comprising forming the core section to have a width that varies in the preform longitudinal direction while the cladding section comprises a width that is substantially constant in the preform longitudinal direction.

17. The method according to claim 15, further comprising forming the core section to have a width that is substantially constant in the preform longitudinal direction while the cladding section comprises a width that varies in the preform longitudinal direction.

18. The method according to claim 15, wherein $\delta[\Delta f]$ is at least 20 MHz.

19. The method according to claim 15, wherein $\delta[\Delta f]$ changes by at least 40 MHz over each period p.

20. The method according to claim 15, wherein $0<d_T/d_F<0.01$.

21. The method according to claim 15, wherein $0<d_T/d_F<0.001$.

22. The method according to claim 15, wherein the period p is equal to or greater than 0.5 km.

23. The single-mode optical fiber according to claim 22, wherein the period p is in the range from 0.5 km≤p≤5 km.

24. The method according to claim 15, wherein the optical fiber comprises a mode field diameter in the range from 9 µm to 11 µm at a wavelength of 1550 nm.

25. A method of making a single-mode optical fiber comprising a fiber longitudinal direction and a Brillouin frequency shift $\Delta f$, the method comprising:
a) forming a preform comprising a core section surrounded by a cladding section;
b) drawing the preform by changing the fiber diameter with a period p along the fiber longitudinal direction to form the optical fiber to define a core region from the core section and a cladding region from the cladding section; and
wherein:
iii. the core region comprises an inner core region immediately surrounded by an outer core region, the inner core region comprising a delta value of $\Delta_1$ and radius of $r_1$, and the outer core region comprising a delta value $\Delta_2<\Delta_1$ and a radius $r_2>r_1$ and an annular width $\delta r=r_2-r_1$, wherein $r_2$ is in the range from 3 µm to 10 µm and $\delta r$ is in the range from 1 µm to 9 µm, and wherein $\Delta_1-\Delta_2$ is in the range from 0.3% to 2%;
iv. the cladding region immediately surroundings the outer core region and comprises a delta value of $\Delta_3<\Delta_2$ and a radius $r_3>r_2$, wherein $r_3$ is in the range from 100 to 150 µm; and wherein at least one of $r_1$, $r_2$, $\delta r$ and $r_3$ changes with a period p in the longitudinal direction between first and second values each comprising level distance $d_F$, and wherein the change occurs over a transition distance $d_T$ such that $0<d_T/d_F<0.1$ and wherein the Brillouin frequency shift Δf changes over each period by an amount δ[Δf] that is at least 10 MHz.

26. The method according to claim 25, wherein δ[Δf] is at least 20 MHz.

27. The method according to claim 25, wherein δ[Δf] is at least 40 MHz.

28. The method according to claim 25, wherein $0<d_T/d_F<0.01$.

29. The method according to claim 25, wherein $0<d_T/d_F<0.001$.

30. The method according to claim 25, wherein the period p is equal to or greater than 0.5 km.

31. The single-mode optical fiber according to claim 30, wherein the period p is in the range from $0.5\ km \leq p \leq 5\ km$.

* * * * *

UNITED STATES PATENT AND TRADEMARK OFFICE
CERTIFICATE OF CORRECTION

PATENT NO. : 10,294,146 B2
APPLICATION NO. : 15/691139
DATED : May 21, 2019
INVENTOR(S) : Ming-Jun et al.

Page 1 of 1

It is certified that error appears in the above-identified patent and that said Letters Patent is hereby corrected as shown below:

On the Title Page

In Column 2, item (57), Abstract, Line 12, delete "least" and insert -- at least --, therefor.

On page 2, Column 2, item (56), other publications, Line 6, delete "Jounal" and insert -- Journal --, therefor.

In the Claims

In Column 16, Line 35, Claim 23, delete "The single-mode optical fiber according to claim 22," and insert -- The method according to claim 22, --, therefor.

In Column 17, Line 13, Claim 31, delete "The single-mode optical fiber according to claim 30," and insert -- The method according to claim 30, --, therefor.

Signed and Sealed this
Tenth Day of September, 2019

Andrei Iancu
*Director of the United States Patent and Trademark Office*